(12) United States Patent
Xie

(10) Patent No.: US 10,597,299 B2
(45) Date of Patent: Mar. 24, 2020

(54) SYNTHESIS OF ITE FRAMEWORK TYPE MOLECULAR SIEVES

(71) Applicant: Chevron U.S.A. Inc., San Ramon, CA (US)

(72) Inventor: Dan Xie, Richmond, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 16/193,072

(22) Filed: Nov. 16, 2018

(65) Prior Publication Data

US 2019/0375647 A1 Dec. 12, 2019

Related U.S. Application Data

(60) Provisional application No. 62/681,785, filed on Jun. 7, 2018.

(51) Int. Cl.
| | |
|---|---|
| C01B 39/08 | (2006.01) |
| C01B 39/12 | (2006.01) |
| C01B 39/48 | (2006.01) |
| B01J 29/87 | (2006.01) |
| B01J 29/86 | (2006.01) |
| B01J 29/88 | (2006.01) |
| B01J 29/70 | (2006.01) |

(52) U.S. Cl.
CPC ............... *C01B 39/48* (2013.01); *B01J 29/86* (2013.01); *B01J 29/87* (2013.01); *B01J 29/88* (2013.01); *C01B 39/082* (2013.01); *C01B 39/087* (2013.01); *C01B 39/12* (2013.01); *B01J 29/70* (2013.01); *C01P 2002/72* (2013.01); *C01P 2004/03* (2013.01)

(58) Field of Classification Search
CPC ..... C01B 39/48; C01B 39/082; C01B 39/087; C01B 39/12; B01J 29/70; B01J 29/86; B01J 29/87; B01J 29/88; C01P 2002/72; C01P 2004/03
See application file for complete search history.

(56) References Cited

U.S. PATENT DOCUMENTS

| | | | |
|---|---|---|---|
| 5,939,044 A | 8/1999 | Nakagawa et al. | |
| 6,500,404 B1 | 12/2002 | Camblor Fernandez et al. | |
| 2003/0190282 A1* | 10/2003 | Schmitt | C01B 37/005 423/705 |
| 2016/0122192 A1* | 5/2016 | Dusselier | C07C 67/37 423/703 |
| 2017/0326535 A1 | 11/2017 | Burton | |
| 2018/0265485 A1* | 9/2018 | Nicholas | C07D 295/023 |

OTHER PUBLICATIONS

Dusselier et al,"Small-Pore Zeolites: Synthesis and Catalysis", Chem. Rev. 2018, 118, 5265-5329 (Year: 2018).*

(Continued)

*Primary Examiner* — David M Brunsman
(74) *Attorney, Agent, or Firm* — Terrence M. Flaherty

(57) ABSTRACT

A method is provided for synthesizing molecular sieves of ITE framework type using one or more of 1-ethyl-1,3,5-trimethylpiperidinium cations and 1-ethyl-1-methyldecahydroquinolinium cations a structure directing agent.

14 Claims, 3 Drawing Sheets

(56) References Cited

OTHER PUBLICATIONS

M.A. Camblor, A. Corma, P. Lightfoot L.A. Villaescusa, and P.A. Wright "Synthesis and Structure of ITQ-3, the First Pure Silica Polymorph with a Two-Dimensional System of Straight Eight-Ring Channels" Angew. Chem. Int. Ed. Engl. 1997, 36, 2659-2661.

V. Valtchev, J.-L. Paillaud, T. Lefebvre, D. Le Nouen and H. Kessler "Synthesis and characterization of Mu-14: an aluminosilicate zeolite with ITE-type topology" Micropor. Mesopor. Mater. 2000, 38, 177-185.

P. Wagner, Y. Nakagawa, G.S. Lee, M.E. Davis, S. Elomari, R.C. Medrud and S.I. Zones "Guest/Host Relationships in the Synthesis of the Novel Caged-Based Zeolites SSZ-35, SSZ-36, and SSZ-39" J. Am. Chem. Soc. 2000, 122, 263-273.

\* cited by examiner

SYNTHESIS OF ITE FRAMEWORK TYPE MOLECULAR SIEVES

CROSS-REFERENCE TO RELATED APPLICATIONS

This application claims priority to and the benefit of U.S. Provisional Application Ser. No. 62/681,785, filed Jun. 7, 2018.

FIELD

This disclosure relates to the synthesis of crystalline molecular sieves of ITE framework type.

BACKGROUND

Zeolitic materials are known to have utility as sorbents and to have catalytic properties for various types of organic conversion reactions. Certain zeolitic materials are ordered, porous crystalline materials having a definite crystalline structure as determined by X-ray diffraction. Some crystalline zeolitic materials possess a large number of cavities which may be interconnected by a number of channels or pores. These cavities and pores are uniform in size within a specific zeolite material. Because the dimensions of these pores are such as to accept for sorption molecules of certain dimensions while rejecting those of larger dimensions, these materials have come to be known as "molecular sieves" and are utilized in a variety of industrial processes.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three-letter code and are described in the "*Atlas of Zeolite Framework Types*," Sixth Revised Edition, Elsevier, 2007.

Molecular sieves of ITE framework type possess a two-dimensional system of straight 8-membered ring channels. Molecular sieves with the ITE framework type include ITQ-3, Mu-14 and SSZ-36 (an ITE-RTH intermediate).

U.S. Pat. No. 6,500,404 discloses zeolite ITQ-3 and its synthesis using N,N-dimethyl-6-azonium-1,3,3-trimethylbicyclo[3.2.1]octane cations as a structure directing agent.

V. Valtchev et al. (*Micropor. Mesopor. Mater.* 2000, 38, 177-185) disclose aluminosilicate zeolite Mu-14 and its synthesis using 1-azoniatricyclo[4.4.4.0$^{1,6}$]tetradecane cations as a structure directing agent.

U.S. Pat. No. 5,939,044 discloses zeolite SSZ-36 and its synthesis using certain monocyclic or polycyclic quaternary ammonium cations as a structure directing agent.

U.S. Patent Application Publication No. 2017/0326535 discloses the synthesis of ITE framework type molecular sieves using a structure directing agent selected from [L(DETA)$_2$]$^{2+}$ cation and [L(TEPA)]$^{2+}$ cation, where L is a divalent metal comprising at least one of Ni, Co and Mn; DETA is diethylene triamine; and TEPA is tetraethylene pentaamine.

According to the present disclosure, it has now been found the cations described herein are effective as structure directing agents in the synthesis of ITE framework type molecular sieves.

SUMMARY

In one aspect, there is provided a method of synthesizing a molecular sieve of ITE framework type, the method comprising: (a) providing a reaction mixture comprising: (1) a source of silicon oxide; (2) a source of an oxide of a trivalent element (X); (3) a structure directing agent (Q) comprising one or more of 1-ethyl-1,3,5-trimethylpiperidinium cations and 1-ethyl-1-methyldecahydroquinolinium cations; and (4) water; and (b) subjecting the reaction mixture to crystallization conditions sufficient to form crystals of the molecular sieve.

In another aspect, there is provided a molecular sieve of ITE framework type, and, in its as-synthesized form, comprising one or more of 1-ethyl-1,3,5-trimethylpiperidinium cations and 1-ethyl-1-methyldecahydroquinolinium cations in its pores.

DETAILED DESCRIPTION

Introduction

Figure 1:
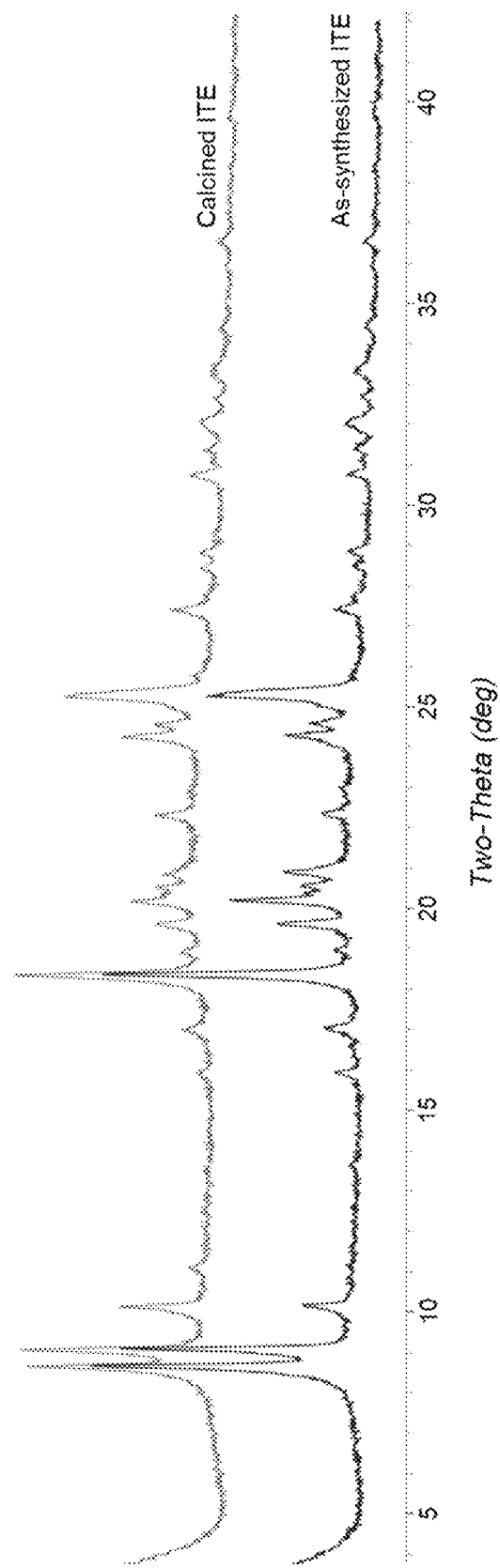
FIG. 1 compares the powder X-ray diffraction (XRD) patterns of the as-synthesized ITE molecular sieve prepared in Example 1 and the calcined ITE molecular sieve prepared in Example 5.

The term "framework type" is used in the sense described in the "*Atlas of Zeolite Framework Types*," Sixth Revised Edition, Elsevier, 2007.

The term "as-synthesized" is employed herein to refer to a molecular sieve in its form after crystallization, prior to removal of the structure directing agent.

The term "anhydrous" is employed herein to refer to a molecular sieve substantially devoid of both physically adsorbed and chemically adsorbed water.

As used herein, the numbering scheme for the Periodic Table Groups is as disclosed in *Chem. Eng. News* 1985, 63(5), 26-27.

Reaction Mixture

In general, a molecular sieve of ITE framework type may be synthesized by: (a) providing a reaction mixture comprising: (1) a source of silicon oxide; (2) a source of an oxide of a trivalent element (X); (3) a structure directing agent (Q) comprising one or more of 1-ethyl-1,3,5-trimethylpiperidinium cations and 1-ethyl-1-methyldecahydroquinolinium cations; and (4) water; and (b) subjecting the reaction mixture to crystallization conditions sufficient to form crystals of the molecular sieve.

The reaction mixture may have a composition, in terms of molar ratios, within the following ranges identified in Table 1:

TABLE 1

| Reactants | Useful | Exemplary |
|---|---|---|
| SiO$_2$/X$_2$O$_3$ | 5 to 100 | 20 to 60 |
| Q/SiO$_2$ | 0.05 to 0.50 | 0.10 to 0.30 |
| H$_2$O/SiO$_2$ | 10 to 80 | 15 to 50 | wherein X is a trivalent element and Q comprises one or more of 1-ethyl-1,3,5-trimethylpiperidinium cations and 1-ethyl-1-methyldecahydroquinolinium cations.

Suitable sources of silicon oxide include fumed silica, colloidal silica, precipitated silica, alkali metal silicates and tetraalkyl orthosilicates.

Suitable sources of the trivalent element (X) can depend on the element X that is selected (e.g., boron, aluminum, gallium, and iron). In embodiments where X is boron, sources of boron include boric acid and water-soluble borate salts, such as sodium tetraborate and potassium tetraborate.

The structure directing agent (Q) comprises one or more of 1-ethyl-1,3,5-trimethylpiperidinium cations and 1-ethyl-1-methyldecahydroquinolinium cations, represented by the following structures (1) and (2), respectively:

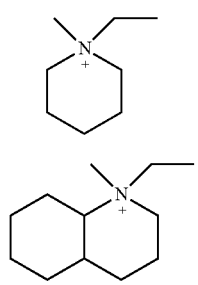

Suitable sources of Q are the hydroxides and/or other salts of the relevant quaternary ammonium compounds.

The reaction mixture may also contain seeds of a molecular sieve material, such as a molecular sieve of ITE framework type, from a previous synthesis, desirably in an amount of from 0.01 to 10,000 ppm by weight (e.g., from 100 to 5,000 ppm by weight) of the reaction mixture. Seeding can be advantageous in decreasing the amount of time necessary for complete crystallization to occur. In addition, seeding can lead to an increased purity of the product obtained by promoting the nucleation and/or formation of ITE framework type materials over any undesired phases.

For each embodiment described herein, the molecular sieve reaction mixture can be supplied by more than one source. Also, two or more reaction components can be provided by one source.

The reaction mixture can be prepared either batch wise or continuously. Crystal size, morphology and crystallization time of the molecular sieve described herein can vary with the nature of the reaction mixture and the crystallization conditions.

Crystallization and Post-Synthesis Treatment

Crystallization of the molecular sieve from the above reaction mixture can be carried out under either static, tumbled or stirred conditions in a suitable reactor vessel, such as for example polypropylene jars or Teflon-lined or stainless-steel autoclaves, at a temperature of from 125° C. to 200° C. for a time sufficient for crystallization to occur at the temperature used, e.g., from about 5 to 60 days. Crystallization is usually conducted in an autoclave so that the reaction mixture is subject to autogenous pressure.

Once the molecular sieve crystals have formed, the solid product is separated from the reaction mixture by standard mechanical separation techniques such as centrifugation or filtration. The crystals are water-washed and then dried to obtain the as-synthesized molecular sieve crystals. The drying step is typically performed at a temperature of less than 200° C.

As a result of the crystallization process, the recovered crystalline molecular sieve product contains within its pores at least a portion of the structure directing agent used in the synthesis.

To the extent desired, any cations in the as-synthesized molecular sieve can be replaced in accordance with techniques well known in the art by ion exchange with other cations. Preferred replacing cations include metal ions (e.g., rare earth metals and metals of Groups 2 to 15 of the Periodic Table), hydrogen ions, hydrogen precursor ions (e.g., ammonium ions), and combinations thereof.

The molecular sieve described herein may be subjected to treatment to remove part or all of the structure directing agent used in its synthesis. This is conveniently effected by thermal treatment in which the as-synthesized material is heated at a temperature of at least about 370° C. for at least 1 minute and generally not longer than 20 hours. The thermal treatment can be performed at a temperature up to 925° C. While sub-atmospheric pressure can be employed for the thermal treatment, atmospheric pressure is desired for reasons of convenience. Additionally or alternatively, the structure directing agent can be removed by treatment with ozone (see, e.g., A. N. Parikh et al., *Micropor. Mesopor. Mater.* 2004, 76, 17-22).

The present molecular sieve can be formulated into a catalyst composition by combination with other materials, such as binders and/or matrix materials, which provide additional hardness or catalytic activity to the finished catalyst. When blended with such components, the relative proportions of ITE-type molecular sieve and matrix may vary widely with the ITE-type molecular sieve content ranging from 1 to 90 wt. % (e.g., from 2 to 80 wt. %) of the total catalyst.

Characterization of the Molecular Sieve

In its as-synthesized and anhydrous form, the present ITE framework type molecular sieve may have a chemical composition comprising the following molar relationship described in Table 2:

TABLE 2

| | Broad | Exemplary |
|---|---|---|
| $SiO_2/X_2O_3$ | 5 to 100 | 20 to 60 |
| $Q/SiO_2$ | >0 to 0.1 | >0 to 0.1 | wherein X is a trivalent element and Q comprises one or more of 1-ethyl-1,3,5-trimethylpiperidinium cations and 1-ethyl-1-methyldecahydroquinolinium cations.

It should be noted that the as-synthesized form of the present molecular sieve may have molar ratios different from the molar ratios of reactants of the reaction mixture used to prepare the as-synthesized form. This result may occur due to incomplete incorporation of 100% of the reactants of the reaction mixture into the crystals formed (from the reaction mixture).

The ITE framework type molecular sieves synthesized as described herein are characterized by their powder X-ray diffraction (XRD) pattern. Powder XRD patterns representative of ITE framework type molecular sieves can be referenced in "*Collection of Simulated XRD Powder Patterns for Zeolites*" Fifth Revised Edition, Elsevier, 2007, published on behalf of the Structure Commission of the International Zeolite Association.

Minor variations in the diffraction pattern can result from variations in the mole ratios of the framework species of the particular sample due to changes in lattice constants. In addition, sufficiently small crystals will affect the shape and intensity of peaks, leading to significant peak broadening. Minor variations in the diffraction pattern can also result from variations in the organic compound used in the preparation. Calcination can also cause minor shifts in the XRD pattern. Notwithstanding these minor perturbations, the basic crystal lattice structure remains unchanged.

The powder XRD patterns presented herein were collected by standard techniques. The radiation was CuKα radiation. The peak heights and the positions, as a function of 2θ where θ is the Bragg angle, were read from the relative intensities of the peaks (adjusting for background), and d, the interplanar spacing corresponding to the recorded lines, can be calculated.

EXAMPLES

The following illustrative examples are intended to be non-limiting.

Example 1

2.99 g of deionized water, 2.19 g of a 15.84% 1-ethyl-1,3,5-trimethylpiperidinium hydroxide solution, 0.13 g of boric acid powder and 2.00 g of colloidal silica (LUDOX® AS-30) were added to a Teflon liner. Then, 0.11 g of a 33.5% HCl solution was added and mixed to create a relatively uniform suspension. The liner was then capped and placed within a Parr Steel autoclave reactor. The autoclave was then put in an oven heated at 160° C. for 45 days with tumbling at 43 rpm. The solid products were recovered from the cooled reactor by centrifugation, washed with deionized water and dried at 95° C.

The resulting product was analyzed by powder XRD and SEM. The powder XRD pattern of the as-synthesized product is shown FIG. 1 and is consistent with the product being a pure ITE framework type molecular sieve. A SEM image of the product is shown in FIG. 2 and indicates a uniform field of crystals.

The product had a $SiO_2/B_2O_3$ molar ratio of 50.4, as determined by ICP elemental analysis.

Example 2

1.62 g of deionized water, 3.60 g of a 11.6% 1-ethyl-1-methyldecahydroquinolinium hydroxide solution, 0.13 g of boric acid powder, and 2.00 g of colloidal silica (LUDOX® AS-30) were added to a Teflon liner. Then, 0.11 g of a 33.5% HCl solution was added and mixed to create a relatively uniform suspension. The liner was then capped and placed within a Parr steel autoclave reactor. The autoclave was then put in an oven and heated at 160° C. for 42 days with tumbling at 43 rpm. The solid products were recovered from the cooled reactor by centrifugation, washed with deionized water and dried at 95° C.

Figure 3:
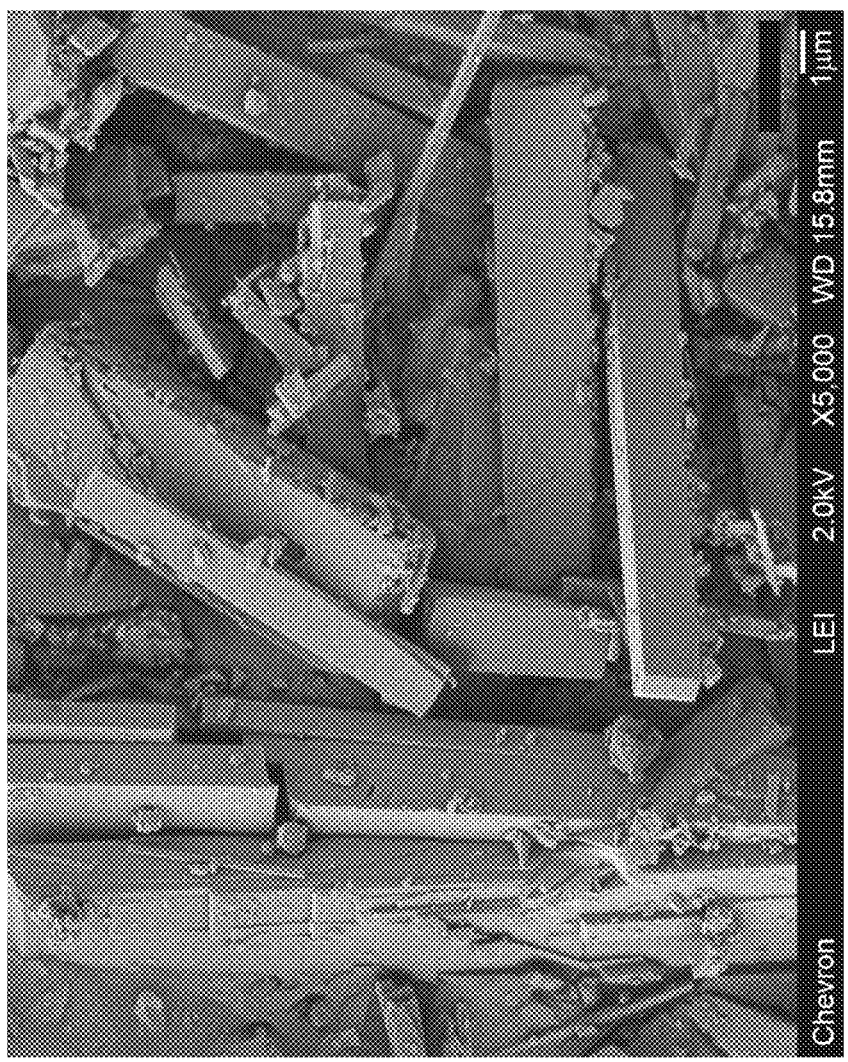
FIG. 3 shows a SEM image of the as-synthesized molecular sieve prepared in Example 2.

The product was identified by powder XRD to be a pure ITE framework type molecular sieve. A SEM image of the product is shown in FIG. 3 and indicates a uniform field of crystals.

The product has a $SiO_2/B_2O_3$ molar ratio of 29.3, as determined by ICP elemental analysis.

Example 3

Example 1 was repeated with the exception that 5 wt. % seed crystals of the ITE-type molecular sieve prepared as described in Example 1 were added to the reaction mixture. The solid products were recovered after 10 days of reaction.

The product was identified by powder XRD and SEM to be a pure ITE framework type molecular sieve.

Example 4

Example 2 was repeated with the exception that 5 wt. % seed crystals of the ITE-type molecular sieve prepared as described in Example 2 were added to the reaction mixture. The solid products were recovered after 10 days of reaction.

The product was identified by powder XRD and SEM to be a pure ITE framework type molecular sieve.

Example 5

The as-synthesized molecular sieve of Example 1 was calcined inside a muffle furnace under a flow of a mixture of nitrogen and air heated to 540° C. at a rate of 1° C./minute and held at 540° C. for 5 hours, cooled and analyzed by powder XRD.

Figure 2:
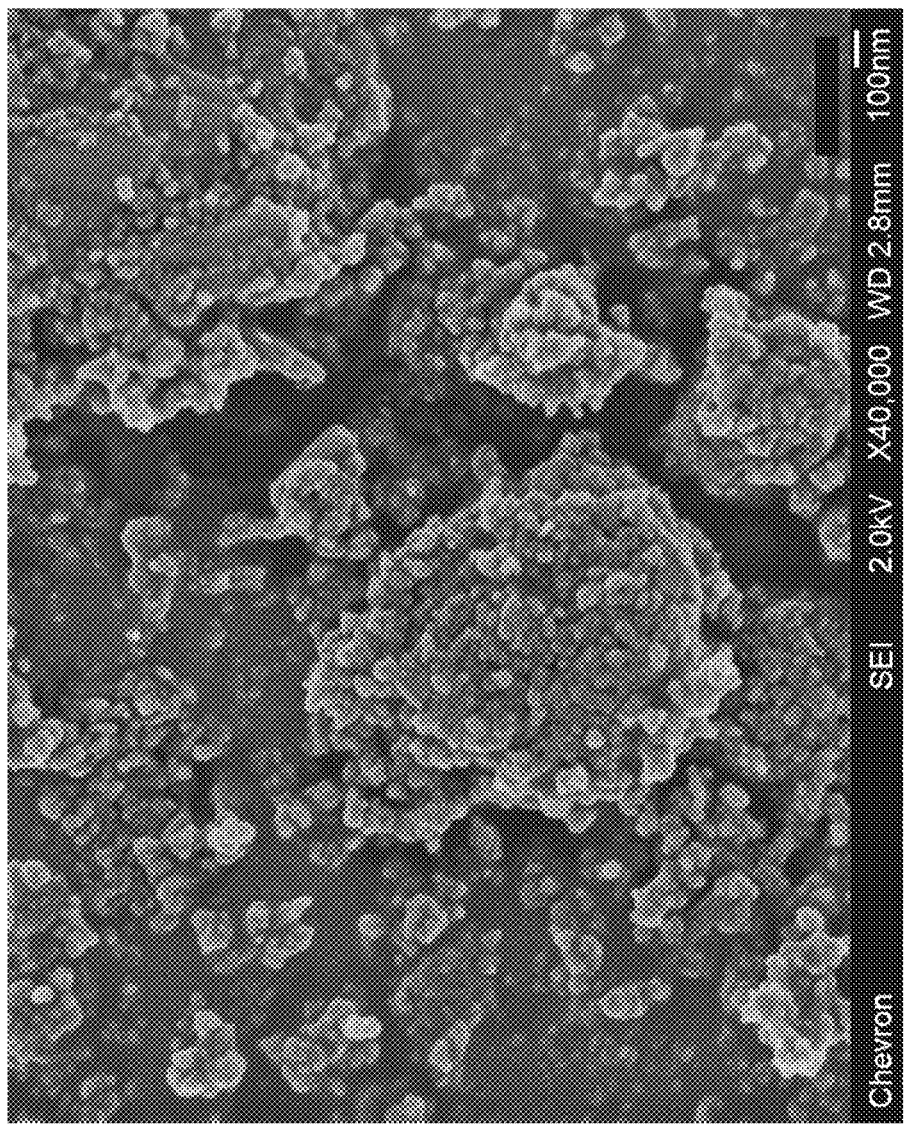
FIG. 2 shows a Scanning Electron Micrograph (SEM) image of the as-synthesized molecular sieve prepared in Example 1.

The powder XRD pattern of the calcined molecular sieve is shown in FIG. 1 and indicates that the material remains stable after calcination to remove the organic matter.

Example 6

Micropore Volume Analysis

The calcined material of Example 5 had a micropore volume of 0.21 cm³/g based on argon adsorption isotherm at 87.50 K (−186° C.) recorded on ASAP 2010 equipment from Micromeritics. The sample is first degassed at 400° C. for 16 hours prior to argon adsorption. The low-pressure dose is 2.00 cm³/g (STP). A maximum of one hour equilibration time per dose is used and the total run time is 37 hours. The argon adsorption isotherm is analyzed using the density function theory (DFT) formalism and parameters developed for activated carbon slits by J. P. Olivier (*J. Porous Mater.* 1995, 2, 9-17) using the Saito Foley adaptation of the Horvarth-Kawazoe formalism (*Micropor. Mater.* 1995, 3, 531-542) and the conventional t-plot method (*J. Catal.* 1965, 4, 319-323).

The invention claimed is:

1. A method of synthesizing a molecular sieve of ITE framework type, the method comprising:
    (a) providing a reaction mixture comprising:
        (1) a source of silicon oxide;
        (2) a source of an oxide of a trivalent element (X);
        (3) a structure directing agent (Q) comprising one or more of 1-ethyl-1,3,5-trimethylpiperidinium cations and 1-ethyl-1-methyldecahydroquinolinium cations; and
        (4) water; and
    (b) subjecting the reaction mixture to crystallization conditions sufficient to form crystals of the molecular sieve.

2. The method of claim 1, wherein the reaction mixture has a composition, in terms of molar ratios, as follows:

| | |
|---|---|
| $SiO_2/X_2O_3$ | 5 to 100 |
| $Q/SiO_2$ | 0.05 to 0.50 |
| $H_2O/SiO_2$ | 10 to 80. |

3. The method of claim 1, wherein the reaction mixture has a composition, in terms of molar ratios, as follows:

| | |
|---|---|
| $SiO_2/X_2O_3$ | 20 to 60 |
| $Q/SiO_2$ | 0.10 to 0.30 |
| $H_2O/SiO_2$ | 15 to 50. |

4. The method of claim 1, wherein the trivalent element (X) comprises one or more of boron, aluminum, gallium, and iron.

5. The method of claim 1, wherein the trivalent element (X) comprises boron.

6. The method of claim 1, wherein the reaction mixture also contains seeds.

7. The method of claim 6, wherein the reaction mixture comprises from 0.01 to 10,000 ppm by weight of seeds.

8. The method of claim 6, wherein the seeds comprise a molecular sieve material of ITE framework type.

9. The method of claim 1, wherein the crystallization conditions include a temperature of from 125° C. to 200° C.

10. A molecular sieve of ITE framework type and, in its as-synthesized form, comprising one or more of 1-ethyl-1,3,5-trimethylpiperidinium cations and 1-ethyl-1-methyl-decahydroquinolinium cations in its pores.

11. The molecular sieve of claim 10, and having a $SiO_2/X_2O_3$ molar ratio of 5 to 100, wherein X is a trivalent element.

12. The molecular sieve of claim 11, wherein the trivalent element comprises one or more of boron, aluminum, gallium, and iron.

13. The molecular sieve of claim 11, wherein the trivalent element comprises boron.

14. The molecular sieve of claim 11, wherein the $SiO_2/X_2O_3$ molar ratio is in a range of 20 to 60.

* * * * *